US011173577B2

(12) United States Patent
Kunze et al.

(10) Patent No.: US 11,173,577 B2
(45) Date of Patent: Nov. 16, 2021

(54) SIMULTANEOUS MEASUREMENT IN MULTIPLE SPINDLE MACHINE TOOLS

(71) Applicant: Siemens Aktiengesellschaft, Munich (DE)

(72) Inventors: Patrick Kunze, Chemnitz (DE); Holger Kretschmar, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/059,955

(22) PCT Filed: May 15, 2019

(86) PCT No.: PCT/EP2019/062455
§ 371 (c)(1),
(2) Date: Nov. 30, 2020

(87) PCT Pub. No.: WO2019/228806
PCT Pub. Date: Dec. 5, 2019

(65) Prior Publication Data
US 2021/0220957 A1 Jul. 22, 2021

(30) Foreign Application Priority Data
Jun. 1, 2018 (EP) .................... 18175555

(51) Int. Cl.
*B23Q 15/12* (2006.01)
*G01B 5/207* (2006.01)

(52) U.S. Cl.
CPC ............. *B23Q 15/12* (2013.01); *G01B 5/207* (2013.01)

(58) Field of Classification Search
None
See application file for complete search history.

(56) References Cited

U.S. PATENT DOCUMENTS

| 5,056,235 A * | 10/1991 | Thomas | ................. G08C 15/04 33/503 |
| 6,694,627 B2 * | 2/2004 | Ito | ......................... H05K 3/0047 33/1 M |
| 2012/0060384 A1 | 3/2012 | Groezinger et al. | |

FOREIGN PATENT DOCUMENTS

| CN | 162169420 A | 9/2011 | |
| DE | 102015205566 A1 * | 9/2016 | ........... G01B 21/042 |

(Continued)

OTHER PUBLICATIONS

PCT International Search Report and Written Opinion of International Searching Authority dated Jul. 30, 2019 corresponding to PCT International Application No. PCT/EP2019/062455 filed May 15, 2019.

*Primary Examiner* — Christopher W Fulton
(74) *Attorney, Agent, or Firm* — Henry M. Feiereisen LLC (57) ABSTRACT

A machine tool holding workpieces has measuring probes disposed on spindles. The spindles move in common relative to the workpieces until a termination criterion is reached for the common displacement movement. During the common displacement movement, a position of a measuring probe relative to a respective workpiece is detected where the measuring probe makes contact with the respective workpiece or loses contact with the respective workpiece, allowing geometric statements about the respective workpiece to be derived. The measuring probes are kept at a rest position relative to their respective spindle during the common displacement movement, as long as the respective measuring probe does not yet make contact with the respective workpiece. Following contact with the respective workpiece, a deflection from a rest position is detected. The termination criterion is satisfied as soon as the deflection of (Continued)

at least one of the measuring probes reaches a maximum deflection.

7 Claims, 4 Drawing Sheets

(56) References Cited

FOREIGN PATENT DOCUMENTS

| EP | 0 326 625 | | 8/1989 | |
|----|-----------|----|--------|----------|
| EP | 2377645 | A1 | 10/2011 | |
| EP | 2645051 | A1 * | 10/2013 | ............ G01B 5/207 |
| WO | WO 2018/033704 | | 2/2018 | |

* cited by examiner

SIMULTANEOUS MEASUREMENT IN MULTIPLE SPINDLE MACHINE TOOLS

CROSS-REFERENCES TO RELATED APPLICATIONS

This application is the U.S. National Stage of International Application No. PCT/EP2019/062455, filed May 15, 2019, which designated the United States and has been published as International Publication No. WO 2019/228806 A1 and which claims the priority of European Patent Application, Serial No. 18175555.4, filed Jun. 1, 2018, pursuant to 35 U.S.C. 119(a)-(d).

BACKGROUND OF THE INVENTION

The present invention is based on an operating method for a machine tool, in which one workpiece is arranged in each of a plurality of workpiece holders of the machine tool, and one measuring sensor is arranged in each of a plurality of spindles of the machine tool.
wherein the spindles are repeatedly moved in a common and similar manner relative to the workpieces in a respective common and similar traversing movement, until a respective cancel condition for the respective traversing movement is achieved.
wherein, during the respective common and similar traversing movement, for each of the measuring sensors, a position of the respective measuring sensor relative to the respective workpiece is captured, at which the respective measuring sensor touches the respective workpiece, so that, on the basis of the positions of the respective measuring sensor captured for the respective workpiece, it is possible to derive geometric statements regarding the respective workpiece.

The present invention is furthermore based on a computer program comprising machine code which can be executed by a control facility for a machine tool, wherein the execution of the machine code by the control facility causes the control facility to control the machine tool in accordance with an operating method of this kind.

The present invention is furthermore based on a control facility for a machine tool, wherein the control facility is programmed with a computer program of this kind, so that the control facility controls the machine tool in accordance with an operating method of this kind.

The present invention is furthermore based on a machine tool,
wherein the machine tool has a plurality of workpiece holders for holding one workpiece in each case.
wherein the machine tool has a plurality of spindles for holding one measuring sensor in each case,
wherein the machine tool has a control facility of this kind.

The subject matters mentioned above are known from EP 0 326 625 A1.

In "normal" machine tools, as a rule, a single workpiece holder is present and furthermore for the most part just a single spindle is also present. If a workpiece situated in the workpiece holder is to be measured, then a measuring sensor is arranged in the spindle of the machine tool. Subsequently, the measuring sensor is moved sequentially, in succession, by means of a respective traversing movement, until the measuring sensor touches the workpiece or loses contact with the workpiece. The position of the measuring sensor relative to the workpiece given at this point in time is captured. On the basis of the position of the measuring sensor captured for the workpiece overall, it is then possible to derive geometric statements regarding the workpiece, for example the dimensions thereof or the contour thereof or the arrangement and embodiment of individual elements of the contour.

Furthermore, machine tools are also known which have a plurality of workpiece holders and a plurality of spindles. These machine tools have the advantage that a separate workpiece can be arranged in each workpiece holder in each case, and by means of a traversing movement which is uniform across all spindles it is possible to process a plurality of workpieces in a simultaneous and uniform manner.

In machine tools of this kind, it is also possible to measure workpieces situated in the workpiece holders. For this purpose, a measuring sensor is arranged in each of the spindles of the machine tool.

The general practice consists in activating only one of the measuring sensors in each case, measuring one of the workpieces completely by means of said one measuring sensor—i.e. by means of a plurality of traversing movements, then activating another measuring sensor and repeating the traversing movements, thus measuring another workpiece. Various traversing movements are therefore carried out in succession, while one and the same measuring sensor is activated in each case. Only when all measurement results are available for this one measuring sensor is the next measuring sensor activated. This approach is very time-consuming.

From WO 2018/033 704 A1, it is likewise known to activate only one of the measuring sensors in each case. In contrast to general practice, in WO 2018/033 704 A1, however, the same traversing movement is carried out multiple times in succession, wherein another of the measuring sensors is activated in each case. Only when all the measurement results of all measuring sensors are available for this one traversing movement does this method proceed to the next traversing movement. This approach already represents progress, but still requires too much time.

The object of the present invention consists in creating possibilities which can be used to make it possible to measure a plurality of similar workpieces in a simple, reliable and above all rapid manner, while nonetheless safely avoiding damage to the measuring sensors.

SUMMARY OF THE INVENTION

The object is achieved by an operating method as set forth hereinafter, Advantageous embodiments of the operating method are the subject matter of dependent claims.

According to the invention, an operating method of the kind mentioned in the introduction is embodied such that
during the respective common and similar traversing movement relative to their respective spindle, the measuring sensors are kept in a rest position, if and for as long as the respective measuring sensor is not yet touching the respective workpiece, and after touching the respective workpiece, a respective deflection of the respective measuring sensor from a respective rest position is captured, and
the cancel condition is met as soon as the deflection of at least one of the measuring sensors achieves a respective maximum deflection during the respective common and similar traversing movement.

Thus, during an individual respective traversing movement, it is indeed possible on the one hand for the respective position of the respective measuring sensor relative to the respective workpiece to be captured simultaneously or almost simultaneously for all measuring sensors. It is therefore no longer necessary to repeat one and the same traversing movement multiple times in succession—namely once for each measuring sensor. By capturing the position of the respective measuring sensor for all measuring sensors during a common traversing movement, it is therefore possible to omit carrying out the traversing movement for the second time, the third time, etc. It is possible to measure a plurality of workpieces in a rapid and efficient manner. This means that, although in some circumstances it may not be necessary to capture data for at least one of the measuring sensors, on the one hand, in any case, there is a high probability that there is already an error in the processing of the workpiece for which the position of the associated measuring sensor is not yet captured at the point in time at which the maximum deflection is achieved. Above all, however, this makes it possible to avoid damaging the measuring sensor whose deflection achieves its maximum deflection.

It is preferably provided that the cancel condition is also met as soon as a position has been captured for all measuring sensors in each case during the respective common and similar traversing movement. As a result, the traversing movement can be terminated immediately, and all measurement results are available for the respective traversing movement.

Preferably, furthermore, whenever the deflection of at least one of the measuring sensors achieves a respective maximum deflection during the respective common and similar traversing movement, a message is output to an operator of the machine tool. The message can be output immediately or at a later point in time. In both cases, the operator is notified when messages fail, and is also notified of which messages have failed, if applicable.

In principle, it is possible for all measuring sensors to capture the deflection and compare this with the respective maximum deflection. In most cases, however, the measuring sensors are embodied similarly, so that they in particular also have the same maximum deflection. In this case, it is preferably only the deflection of the measuring sensor whose position is captured first during the respective common and similar traversing movement which is compared with the respective maximum deflection. By way of this embodiment, the computing effort of the control facility controlling the traversing movements can be kept low.

The object is furthermore achieved in accordance with the invention by a computer program, wherein the execution of the machine code by the control facility causes the control facility to control the machine tool in accordance with an operating method according to the invention.

The object is furthermore achieved in accordance with the invention by a control facility, wherein the control facility is programmed with a computer program according to the invention, so that the control facility controls the machine tool in accordance with an operating method according to the invention.

The object is furthermore achieved in accordance with the invention by a machine tool, wherein in the case of a machine tool of the kind mentioned in the introduction, the control facility is embodied according to the invention.

BRIEF DESCRIPTION OF THE DRAWING

The above-described properties, features and advantages of this invention as well as the manner in which they are achieved will become clearer and more comprehensible in conjunction with the following description of the exemplary embodiments, which are explained in more detail in conjunction with the drawings, in which, in a schematic representation.

DETAILED DESCRIPTION OF PREFERRED EMBODIMENTS

Figure 1:
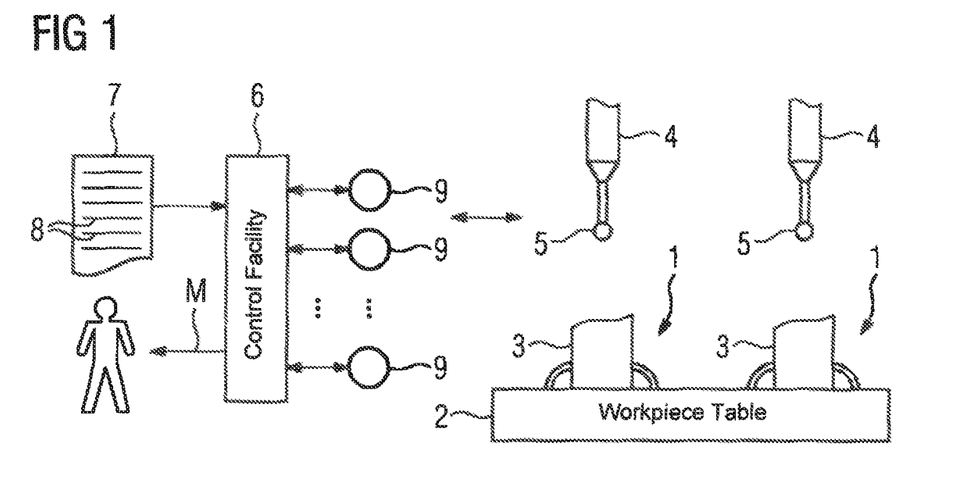
FIG. 1 shows a machine tool and its components.

In accordance with FIG. 1, a machine tool has a plurality of workpiece holders 1. The workpiece holders 1 may be arranged on a workpiece table 2 which is common to the workpiece holders 1, for example. A workpiece 3 may be arranged in each of the workpiece holders 1. The machine tool furthermore has a plurality of spindles 4. A measuring sensor 5 may be arranged in each of the spindles 4. As a rule, each workpiece 3 is assigned precisely one measuring sensor 5. There is therefore a 1:1 relationship between each workpiece 3 and the measuring sensor 5 assigned in each case.

The machine tool furthermore has a control facility 6. The control facility 6 is programmed by means of a computer program 7. The computer program 7 comprises machine code 8 which can be executed by the control facility 6. The execution of the machine code 8 by the control facility 6 causes the control facility 6 to control the machine tool in accordance with an operating method which is explained in further detail below in conjunction with the further FIG.

As a rule, the machine tool first performs a uniform processing on the workpieces 3. In an ideal case, the workpieces 3 are identical following the processing. While processing the workpieces 3, it is not the measuring sensors 5 which are arranged in the spindles 4, but rather tools, for example drills or cutters. In order to process the workpiece 3, according to FIG. 2 in a step S1, as a rule the control facility 6 actuates a plurality of axes 9, by means of which the tool table 2 or in general the workpiece holders 1 and the spindles 4 are moved relative to one another in a position-controlled manner. The processing of the workpieces 3 by the machine tool is generally known to specialists and is of lesser importance in the context of the present invention. For this reason, it is not explained in further detail.

Figure 2:
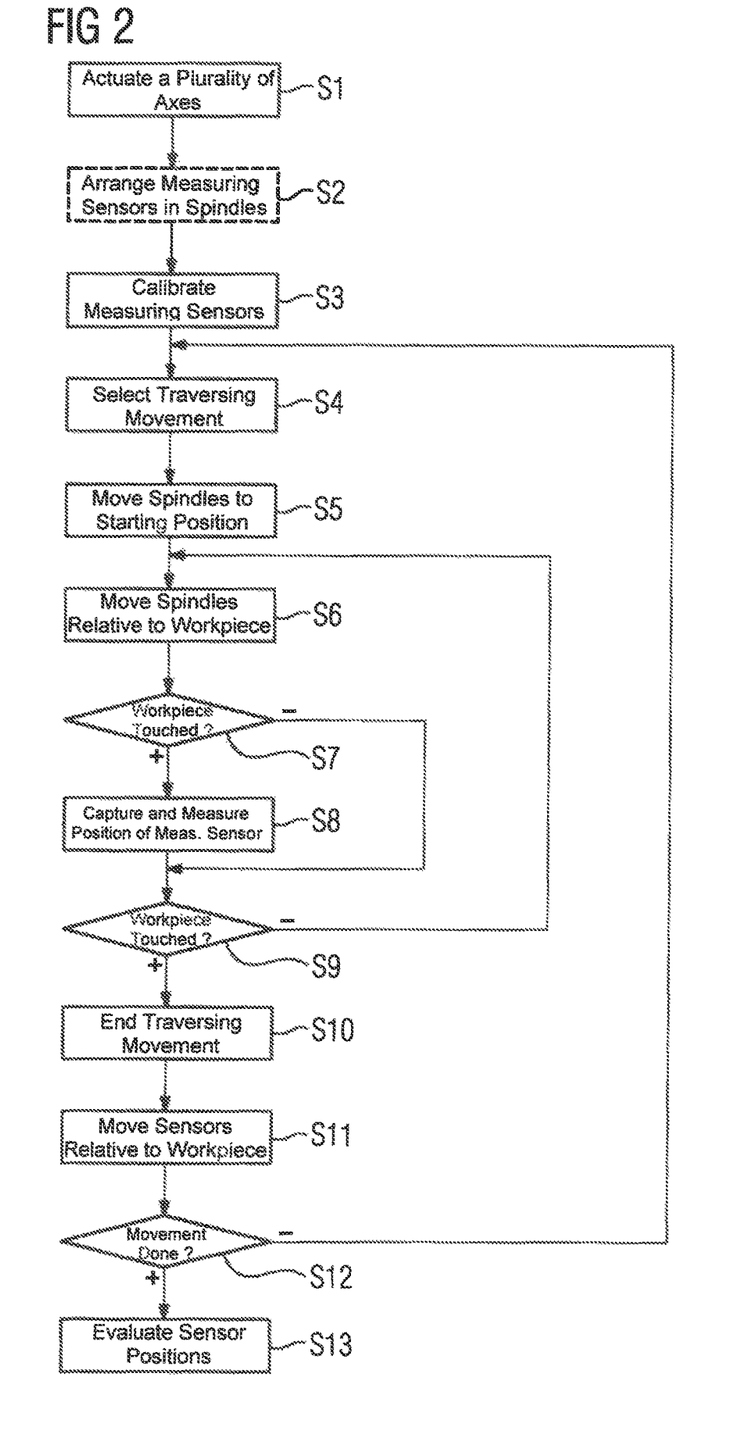
FIG. 2 shows a flow diagram.

The measuring sensors 5 are then arranged in the spindles 4. It is possible for this measure to be performed manually by an operator 10 of the machine tool. Alternatively, it may be performed by the control facility 6 in a step S2. As step S2 does not necessarily have to be carried out by the control facility 6, step S2 is only shown in a dashed manner in FIG. 2. The method according to the invention begins with arranging the measuring sensors 5 in the spindles 4.

Where necessary, a calibration of the measuring sensors 5 takes place first in a step S3. This calibration is specific to the respective measuring sensor 5. As such, is not the subject matter of the present invention. It is necessary, however, that for each measuring sensor 5, due to the actuation of the axes 9, the associated arrangement of the respective measuring sensor 5 in a machine coordinate system can be ascertained in an unambiguous and exact manner. Calibrations of this kind are known to specialists. For this reason, they do not have to be explained in further detail.

The control facility 6 then selects a traversing movement in a step S4. In a step S5, the control facility 6 moves the spindles 4 to a starting position of the respective traversing movement. In a step S6, the control facility 6 moves the spindles 4 relative to the workpieces 3.

The traversing movement is common and similar for the spindles 4. "Common and similar" primarily means that although the starting positions of the measuring sensors 5 in the machine coordinate system are individually different, the geometric offset from measuring sensor 5 to measuring sensor 5, as far as possible, corresponds to the geometric offset of the workpieces 3 assigned in each case. Therefore, if four workpieces 3 are arranged next to one another on the workpiece table 2 with a spacing of 30 cm in each case, for example, then the measuring sensors 5 are also arranged next to one another with an offset of 30 cm from one another. "Common and similar" furthermore means that although the positions of the measuring sensors 5 in the machine coordinate system are individually different, also while the measuring sensors 5 move relative to the workpieces 3, the geometric offset from measuring sensor 5 to measuring sensor 5, as far as possible, also corresponds to the geometric offset of the workpieces 3 assigned in each case during the movement. Therefore, for example, if one of the measuring sensors 5 is moved by 5 cm in a particular direction, then the other measuring sensors 5 will also move by 5 cm in the same direction. Traversing movements therefore take place in the same direction in each case and over the same path for all measuring sensors 5.

While the measuring sensors 5 are moving, the control facility 6 checks in a step S7 whether one of the measuring sensors 5 touches the workpiece 3 to which it is assigned. If this is the case, then in a step S8, for this measuring sensor 5, the control facility 6 captures and stores the position of the respective measuring sensor 5 relative to the assigned workpiece 3. As a rule, the position will comprise at least the translational coordinates of the measuring sensor 5 relative to the workpiece 3 assigned in each case. Where necessary, however, the position may also—as a rule additionally—comprise the orientation of the measuring sensor 5 relative to the workpiece 3 assigned in each case.

In this context, the term "capture" therefore does not solely mean that the respective position is briefly known to the control facility 6 and is then forgotten again. Rather, it is necessary for the position to remain stored until, for all traversing movements, the respective position of the respective measuring sensor 5 is captured and the positions are evaluated.

In a step S9, the control facility 6 checks whether, during the respective common and similar traversing movement, for all measuring sensors 5, it has already captured a contact with the workpiece 3 to which the respective measuring sensor 5 is assigned (i.e. a touch), or the loss of the contact thereof. If this is not the case, then the control facility 6 returns to step S6. i.e. continues the traversing movement. By contrast, if the control facility 6, for all measuring sensors 5, has already captured a contact with the respective workpiece 3 or the loss of contact, then the control facility 6 proceeds to a step S10.

In step S10, the control facility 6 terminates the respective traversing movement. Where necessary, in a step S11, the control facility 6 may furthermore prompt a movement of the measuring sensor 5 relative to the workpieces 3, so that the measuring sensors 5 are no longer contacting the workpieces 3 assigned in each case. For example, in step S11, the control facility 6 may transfer the measuring sensors 5 into a defined standard position. In some embodiments of the present invention, however, step S11 may also be embodied in other ways, or in some circumstances may even be omitted.

In a step S12, the control facility 6 then checks whether it has already carried out all traversing movements. If this is not the case, then the control facility 6 returns to step S4. If the step S4 is carried out again, however, it selects a different traversing movement which had not yet been carried out before now. Otherwise, the control facility 6 proceeds to a step S13. In step S13, it is then possible to undertake an evaluation of the positions captured in each case during the repeated carrying out of step S8. As part of this evaluation, it is particularly possible for geometric statements regarding the respective workpiece 3 to be derived on the basis of the positions of the respective measuring sensor 5 captured for the respective workpiece 3. As a rule, step S13 is a constituent part of the operating method according to the invention. In individual cases, however, it may also be carried out by a facility other than the control facility 6.

Figure 3:
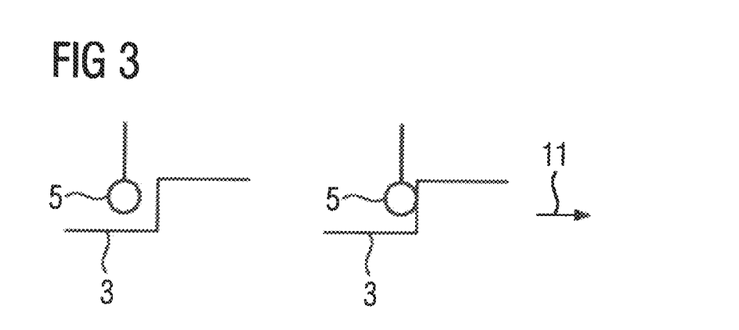
FIG. 3 shows workpieces and measuring sensors at a particular point in time.

As part of the approach according to the invention, i.e. as part of one and the same traversing movement, for each measuring sensor 5 the position thereof is captured once in each case. If, according to the representation in FIG. 3 for example, a traversing movement of the measuring sensors 5 relative to the workpieces 3 takes place in the direction indicated with the arrow 11, then in the configuration indicated in FIG. 3 it is the measuring sensor 5 shown on the right which first touches the workpiece 3 assigned to it. Until this point in time—i.e. for as long as the measuring sensors 5 are not yet touching the workpieces, the measuring sensors 5 are kept in a respective rest position relative to their respective spindle 4 according to the representation in FIG. 3.

Figure 4:
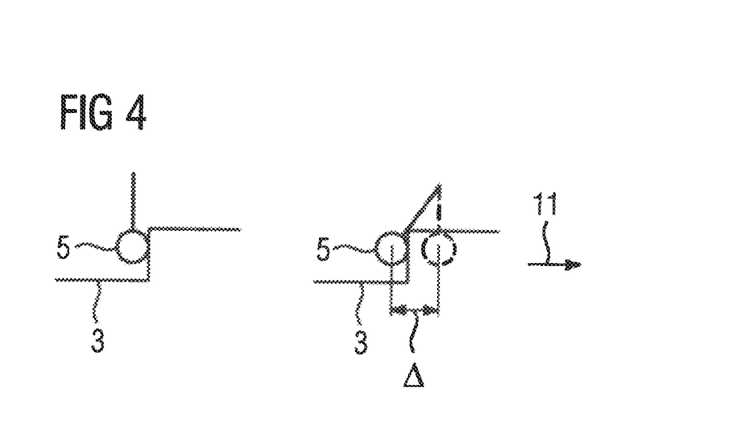
FIG. 4 shows the workpieces and measuring sensors from FIG. 3 at a later point in time.

At the point in time of touching, the indicated position of the corresponding measuring sensor 5 is captured and stored. Since, at this point in time, the measuring sensor 5 shown on the left in FIG. 3 has not yet touched its workpiece 3, however, the traversing movement is continued until this measuring sensor 5 has also touched its workpiece 3. The right-hand measuring sensor 5 is deflected out of its rest position (shown dashed in FIG. 4) by a deflection $\Delta$ during this period of time—i.e. during the respective common and similar traversing movement, but after touching "its" workpiece 3. As a rule, the deflection $\Delta$ is only minor. Only when the measuring sensor 5 shown on the left in FIGS. 3 and 4 also contacts its workpiece 3 (or in general the last measuring sensor 5 contacts its workpiece 3) is the traversing movement terminated.

Figure 5:
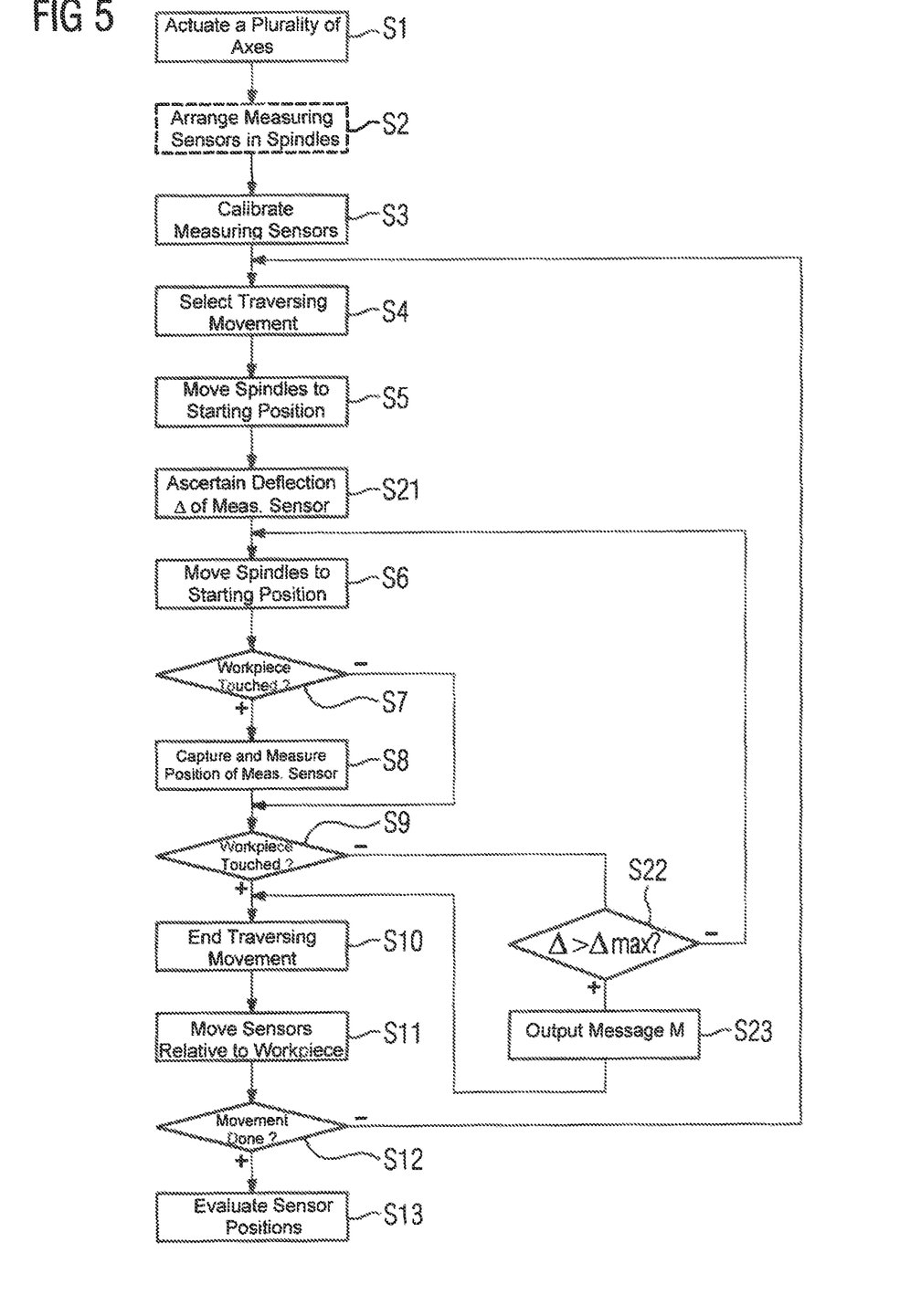
FIG. 5 shows a flow diagram.

FIG. 5 shows the actual invention, it builds upon FIG. 2. The common steps S1 to S13 are therefore not explained again. In addition, however, FIG. 5 comprises at least steps S21 and S22. In step S21, for each measuring sensor 5 which has already contacted its workpiece 3, the control facility 6 ascertains the current deflection $\Delta$ thereof. In step S22, for each measuring sensor 5 which has already contacted its workpiece 3, the control facility 6 checks whether the current deflection $\Delta$ thereof achieves or exceeds a respective maximum deflection $\Delta max$. As soon as this is the case, the control facility 6 then also proceeds to step S10 if not all measuring sensors 5 have yet contacted their respective workpiece 3 or lost contact with the respective workpiece 3.

The embodiment according to the invention therefore consists in the cancel condition for terminating the respective traversing movement not only being met when a position has been captured for all measuring sensors 5 as part of the respective traversing movement. Rather, the cancel condition for the respective traversing movement is also met when the deflection $\Delta$ of at least one of the measuring sensors 5 achieves its respective maximum deflection $\Delta max$ during the respective traversing movement.

Often, a step S23 is additionally also present. In step S23, the control facility 6 prompts a message M to be output to the operator 10. If necessary, the message can be output to the operator 10 immediately or at a later point in time—for example as part of the evaluation of step S13.

Furthermore, step S21 can be modified to the effect that the deflection Δ is only captured and compared with the respective maximum deflection Δmax for the measuring sensor 5 whose position during the respective traversing movement is captured first, i.e. which touches its workpiece 3 first.

The present invention has many advantages. In particular, it is possible to measure a plurality of workpieces 3 in an efficient and rapid manner. A risk of damage to the machine tool or the workpieces 3 is excluded. Furthermore, a simple programming is produced.

Although the invention has been illustrated and described in greater detail with the preferred exemplary embodiment, the invention is not restricted by the examples disclosed and other variations can be derived therefrom by the person skilled in the art without departing from the protective scope of the invention.

What is claimed is:

1. A method for operating a machine tool, which has a plurality of workpiece holders which each hold a respective workpiece, and a plurality of spindles which each have a respective measuring sensor capable of being deflected from a rest position, the method comprising:
    moving the plurality of spindles relative to the plurality of workpieces repeatedly in a common and similar traversing movement, with the measuring sensors being kept in the rest position for as long as the measuring sensors do not touch a workpiece;
    when one of the measuring sensors touches the respective workpiece associated with the one measuring sensor during the common and similar traversing movement, measuring for the one measuring sensor a position relative to the respective workpiece, and derive geometric statements regarding the respective workpiece based on the position of the one measuring sensor;
    after the one measuring sensor touches the respective workpiece and while continuing the common and similar traversing movement, measuring a deflection of the one measuring sensor from the rest position; and
    defining a cancel condition for the common and similar traversing movement when the one measuring sensor attains a predetermined maximum deflection during the common and similar traversing movement, which cancel condition causes the common and similar traversing movement to stop.

2. The method of claim 1, wherein the cancel condition is met when a position has been captured for all measuring sensors during the common and similar traversing movement.

3. The method of claim 1, further comprising outputting a message to an operator of the machine tool when the deflection of at least one of the measuring sensors achieves the predetermined maximum deflection during the common and similar traversing movement.

4. The method of claim 3, further comprising comparing with the predetermined maximum deflection only the deflection of the measuring sensor whose position is captured first during the common and similar traversing movement.

5. A computer program embodied on a non-transitory computer-readable medium and comprising machine code which can be executed by a control facility for a machine tool, with the machine tool having a plurality of workpiece holders which each hold a respective workpiece, and a plurality of spindles which each have a respective measuring sensor capable of being deflected from a rest position, wherein the machine code, when stored in a memory of the control facility and executed by the control facility, causes the control facility to control the machine tool by
    moving the plurality of spindles relative to the plurality of workpieces repeatedly in a common and similar traversing movement, with the measuring sensors being kept in the rest position for as long as the measuring sensors do not touch a workpiece,
    when one of the measuring sensors touches the respective workpiece associated with the one measuring sensor during the common and similar traversing movement, measuring for the one measuring sensor a position relative to the respective workpiece, and derive geometric statements regarding the respective workpiece based on the position of the one measuring sensor,
    after the one measuring sensor touches the respective workpiece and while continuing the common and similar traversing movement, measuring a deflection of the one measuring sensor from the rest position, and
    defining a cancel condition for the common and similar traversing movement when the one measuring sensor attains a predetermined maximum deflection during the common and similar traversing movement, which cancel condition causes the common and similar traversing movement to stop.

6. A control facility for a machine tool having a plurality of workpiece holders which each hold a respective workpiece, and a plurality of spindles which each have a respective measuring sensor capable of being deflected from a rest position, wherein the control facility is programmed with computer program embodied on a non-transitory computer-readable medium and comprising machine code which can be executed by the control facility, wherein the machine code, when stored in a memory of the control facility and executed by the control facility, causes the control facility to control the machine tool by
    moving the plurality of spindles relative to the plurality of workpieces repeatedly in a common and similar traversing movement, with the measuring sensors being kept in the rest position for as long as the measuring sensors do not touch a workpiece,
    when one of the measuring sensors touches the respective workpiece associated with the one measuring sensor during the common and similar traversing movement, measuring for the one measuring sensor a position relative to the respective workpiece, and derive geometric statements regarding the respective workpiece based on the position of the one measuring sensor,
    after the one measuring sensor touches the respective workpiece and while continuing the common and similar traversing movement, measuring a deflection of the one measuring sensor from the rest position, and
    defining a cancel condition for the common and similar traversing movement when the one measuring sensor attains a predetermined maximum deflection during the common and similar traversing movement, which cancel condition causes the common and similar traversing movement to stop.

7. A machine tool, comprising:
    a plurality of workpiece holders which each hold a respective workpiece;
    a plurality of spindles which each have a respective measuring sensor capable of being deflected from a rest position; and a control facility configured to control the machine tool by moving the plurality of spindles relative to the plurality of workpieces repeatedly in a common and similar traversing movement, with the measuring sensors being kept in the rest position for as long as the measuring sensors do not touch a workpiece, when one of the measuring sensors touches the respective workpiece associated with the one measuring sensor during the common and similar traversing movement, measuring for the one measuring sensor a position relative to the respective workpiece, and derive geometric statements regarding the respective workpiece based on the position of the one measuring sensor, after the one measuring sensor touches the respective workpiece and while continuing the common and similar traversing movement, measuring a deflection of the one measuring sensor from the rest position, and defining a cancel condition for the common and similar traversing movement when the one measuring sensor attains a predetermined maximum deflection during the common and similar traversing movement, which cancel condition causes the common and similar traversing movement to stop.

* * * * *